United States Patent Office 3,789,025
Patented Jan. 29, 1974

3,789,025
CATALYST IMPREGNATION TECHNIQUE

Samuel J. Tauster, Englishtown, N.J., assignor to Esso Research and Engineering Company
No Drawing. Filed Nov. 28, 1969, Ser. No. 880,951
Int. Cl. B01j 11/06
U.S. Cl. 252—465                                    8 Claims

ABSTRACT OF THE DISCLOSURE

In a method of preparing a supported catalyst by contacting a hydrophilic porous solid catalyst support, such as alumina, with an aqueous solution of a soluble form of a metal catalyst compound to impregnate said support therewith and thereafter calcining the impregnated catalyst support to produce a solid supported catalyst, the improvement comprising forming a slurry of the catalyst support material and an essentially water-immiscible liquid prior to contact with the aqueous solution and thereafter intimately mixing the slurry with the aqueous solution to form a liquid dispersion of the aqueous solution and water-immiscible liquid in contact with the solid catalyst support.

BACKGROUND OF THE INVENTION

Field of the invention

This invention relates to the preparation of catalysts and more particularly to the preparation of catalysts by impregnating catalyst supports with catalytic materials. The invention is particularly concerned with the impregnation of hydrophilic porous catalyst supports with aqueous solutions of metal salts to form a wetted support which may be calcined to produce a solid supported catalyst.

Description of the prior art

Catalyst compositions comprising a major proportion of a support or carrier material such as alumina, silica, silica-alumina, magnesium oxide, magnesia, silica-alumina-magnesia, clay, and the like and a minor proportion of one or more metal oxides such as molybdenum oxide, chromium oxide, cobalt oxide, nickel oxide and the like, have been used for a variety of hydrocarbon conversion processes such as hydrogenation, dehydrogenation, reforming, aromatization, desulfurization and oxidation. These catalysts are ordinarily prepared by impregnating the support or carrier material with an aqueous solution of a soluble form of a metal catalyst component. The impregnated support material is then dried and calcined to produce a solid supported catalyst comprising a metal catalyst component. Many of these catalysts, however, possess one or more deficiencies. For example, one of the best of the non-precious metal-oxide catalysts known heretofore is a chromia-alumina type catalyst described in Canadian Pat. No. 747,969, issued Dec. 6, 1966. The catalyst described in said patent comprises chromium oxide on a support of alumina which has been deacidified by doping with a small quantity of a cesium compound sufficient to introduce about 1 to 5 gram atoms of cesium per 100 gram moles of $Al_2O_3$. This catalyst has high initial activity for the aromatization of hydrocarbons such as n-hexane and n-heptane. However, conversion drops rapidly in a comparatively short time on stream, with some loss of selectivity accompanying the drop in conversion. Furthermore, catalytic activity is not fully restored on regeneration. Although not known with certainty, it appears that deficiencies in these catalysts prepared by conventional impregnation methods can be traced to a concentration buildup of the catalyst component at the pore mouths of the support material. Such a concentration buildup can have a significant effect upon activity inasmuch as coke accumulation at the pore mouth can lead to blockage of the entire pore. The present method of impregnating a support material with a catalyst component permits a gradual and uniform addition of the aqueous salt solution to the support material so that improved dispersion of the catalyst component in the pores of the support is achieved, thereby minimizing adverse effects such as blockage of the pore mouths of the support material.

SUMMARY OF THE INVENTION

In accordance with this invention, catalysts which are conventionally prepared by wet impregnation of a porous hydrophilic solid support material with an aqueous solution of a soluble form of a metal catalyst compound and thereafter calcined to form a solid supported catalyst are improved by forming a slurry of the support material and an essentially water-immiscible liquid and thereafter intimately mixing the slurry with the aqueous solution to form a liquid dispersion of the aqueous solution and water-immiscible liquid in contact with the solid catalyst support. The aqueous solution of a soluble form of a metal catalyst compound when dispersed in the water-immiscible liquid enters the pores of the hydrophilic support material at a more gradual rate than in the case where the support material is contacted solely with the aqueous solution of a soluble form of a metal catalyst compound. After intimately mixing the solid support material with the liquid dispersion, the support material which is impregnated with the aqueous solution is separated from the free liquid and then calcined at elevated temperatures to produce the solid supported catalyst.

The support materials which are impregnated with the catalyst are well known and widely used in the preparation of solid supported catalyst. For the purposes of this invention, it is only necessary that the support material be hydrophilic in nature to effect the transfer of the aqueous solution from the liquid dispersion into the pores of the solid catalyst support. Specific examples of these hydrophilic support materials include alumina; magnesia; silica; silica-alumina; zirconia; clay materials such as kaolin, kaolinite, and bentonite; titania, carbon; zeolites; and the like. Typically, the support materials useful will have pore sizes ranging from 5 to 1000, preferably 5 to 500, angstroms, and surface areas ranging from 10 to 1000, preferably 50 to 1000, square meters per gram.

The essential feature of the liquid which is first contacted with the support material is that it be essentially water-immiscible and that it form a liquid dispersion when intimately mixed with the aqueous solution of a soluble form of a metal catalyst compound. In general, these materials are well known and include the relatively non-polar organic liquids. From the standpoint of convenience and cost, it will be preferable to use hydrocarbons such as hexane, n-heptane, benzene, toluene, xylene and the like.

The heterogeneous mixture of catalyst support and water-immiscible liquid is then intimately mixed with an aqueous solution of a solution form, e.g. salt, of a metal catalyst compound. These water-soluble metal-containing compounds are well known in the art and the particular aqueous solution used forms no part of the invention. Active metal catalyst compounds which may be deposited upon the support material include, among others, molybdenum oxide, cobaltous oxide, chromia, tungsten trioxide, platinium, nickel, iron, cobalt, iridium, rhodium, ruthenium. Water-soluble forms of thes catalytic compounds include, among others, nitrates, chlorides, acetates and polyanion salts, such as chromium nitrate, nickel chloride, nickel nitrate, cobalt nitrate, magnesium nitrate, ammonium metatungstate, ammonium heptamolybdate, and the like. The concentration of the aqueous solution of the soluble form of the metal catalyst compound is a matter of choice and as is apparent to those skilled in the art the solution may range from very dilute to saturated.

The aqueous solution of a soluble form of the metal catalyst compound which is initially dispersed in the water-immiscible liquid gradually enters the pore structure of the support material which is hydrophilic and prefers the aqueous phase to the water-immiscible liquid. The particular temperature and pressure employed in the impregnation step may be those conventionally used in catalyst impregnation. Thus, the temperature and pressure used during the impregnation step may vary widely provided, however, that the aqueous metal salt solution and water-immiscible components are maintained in the liquid state. For convenience, the impregnation steps are usually carried out at ambient conditions of temperature and pressure.

The amounts of water-immiscible liquid and aqueous metal salt solution which are added to the porous support material will depend upon the wetting properties of the support material, and in the case of the aqueous solution, the concentration of the metal salt and the amount of metal catalyst which it is desired to deposit upon the support material. Such amounts will be apparent to those skilled in the art. For example, the relative amount of the aqueous solution employed compared to the amount of solid support material employed may be identical to the amount of aqueous solution contacted with the solid support material in conventional wet impregnation techniques. The amount of the water-immiscible material employed should be sufficient to produce, upon vigorous agitation, a dispersion wherein the water-immiscible phase is the continuous phase surrounding aqueous droplets of suitable size as set forth hereinafter. Thus, for materials such as Cab-O-Sil, with unusual thickening properties, a ratio in the range of 100–150 cc. water-immiscible liquid per gram porous support may be required. For most other support materials, such as $Al_2O_3$, $ZnAl_2O_4$, MgO, ZnO, ratios of 4–20 cc./gram will be adequate.

Upon addition of the aqueous metal salt solution, the resulting mixture is sufficiently agitated to form a liquid dispersion of the aqueous solution and water-immiscible liquid in contact with the solid support material. Thus, the degree of agitation should be sufficient to produce a liquid phase containing droplets of the aqueous solution surrounded by the water-immiscible continuous liquid phase. Typically, the size of the aqueous droplets will range from submicron to 100 microns diameter, often in the range of 10 to 50 microns diameter. As mentioned above, contact with a dispersion containing the aqueous solution of a soluble form of a metal catalyst compound rather than solely with the aqueous solution of a soluble form of a metal catalyst compound produces a superior impregnated catalyst, presumably because there is more uniform distribution of the catalyst component within the pore structure of the support due to the gradual diffusion of the aqueous solution from the dispersion into the pores.

After contact with the aqueous solution, the impregnated solid support material is then removed from the free liquid portion by any convenient means, such as by filtration or centrifugation, and thereafter dried and calcined to deposit the metal or metal oxide, sulfide, etc. upon the support. If the ultimate catalyst component in the formulation is a metal in the elemental state, reduction may be accomplished by suitable treatment with hydrogen or other reducing agent. Calcination may be readily accomplished in accordance with well-known techniques by heating the impregnated support material at elevated temperatures, e.g., about 500° to 1600° F. and at atmospheric or reduced or elevated pressures.

The invention will be further understood by reference to the following examples which includes a preferred embodiment.

DESCRIPTION OF A PREFERRED EMBODIMENT

This example demonstrates the improved catalytic properties of catalysts prepared in accordance with the method of this invention. A cesium-doped alumina catalyst support was prepared as follows: 1560 grams of beta-alumina trihydrate was impregnated with an aqueous solution of 101 grams of $CsNO_3$. The impregnated alumina was dried at 230° F. for 16 hours and then calcined for 8 hours at 1600° F. and atmospheric pressure. The product contained 5 gram atoms of Cs, as $Cs_2O$, per 100 moles of $Al_2O_3$, with a surface area of about 65 to 90 m.²/g.

A 34.5 gram portion of the cesium-doped alumina support was then mixed at ambient conditions (75° F., 1 atmosphere) with 400 milliliters of normal heptane to form a slurry which was rapidly agitated in an osterizer (commercially available Waring Blender). Eleven milliliters of an aqueous solution containing 8.8 grams of chromium nitrate, i.e., $Cr(NO_3)_3 \cdot 9H_2O$, were then added dropwise to the slurry over a period of about 2 minutes with rapid agitation to produce a dispersion in contact with the solid catalyst support material and containing droplets (average diameter in the range of 10 to 50 microns) of aqueous metal salt solution surrounded by the heptane continuous phase. After addition of the aqueous phase, the mixture was filtered to isolate the solid impregnated support which was dried at about 150° F. for about 4 hours and then calcined for about 4 hours at 1000° F. This yielded chromina ($Cr_2O_3$) on cesium-doped alumina containing 7.8 gram atoms of Cr and 5 gram atoms of Cs per 100 moles of $Al_2O_3$.

The above catalyst was compared with a standard chromia catalyst well known and widely used for n-heptane aromatization. The standard catalyst was prepared by contacting 109 grams of the above cesium-doped alumina support 70 milliliters of the aqueous chromium nitrate solution. The thus impregnated support was then dried and calcined as before. The composition of the standard catalyst was 20 gram atoms of Cr and 5 gram atoms of Cs per 100 moles of $Al_2O_3$.

The catalysts prepared in this example were compared in catalytic activity for aromatization. Aromatization operating conditions were 925° F., atomospheric pressure, space velocity of 3.25 v./v./hr. and a hydrogen to normal heptane feed volume ratio of 1. Prior to use, both catalysts were identically treated by passing hydrogen through a bed of the catalyst for 90 minutes at 550° C., 1 atmosphere and a space velocity of about 5,000 v./v./hr. where the volume of hydrogen gas is measured at standard temperature and pressure. The percentage of aromatization and the selectivity (which is the amount of heptane converted to aromatics divided by the total conversion of heptane) as a function of time on-stream given below in Table I.

TABLE I

| Catalyst | Percent conversion to aromatics (wt.) | | Percent selectivity | |
|---|---|---|---|---|
| | Standard | Invention | Standard | Invention |
| Minutes on stream: | | | | |
| 5 | 24.0 | 15.5 | 90 | 90 |
| 72 | 14.0 | 14.2 | 89 | 92 |
| 127 | 10.6 | 13.3 | 87 | 91 |

Referring to the above table, it is seen that the catalyst prepared in accordance with the invention deactivates at a much slower rate than the standard chromia catalyst. Thus, whereas the standard catalyst has the higher initial activity, this being expected as the chromia contents are 20 vs. 7.8, after two hours on stream it is significantly lower in aromatization activity. Accompanying these changes in activity, it is seen that significant selectivity advantages manifest themselves for the catalyst of the invention.

What is claimed is:

1. In a method of preparing a supported catalyst by the steps which include contacting a hydrophilic porous solid catalyst support with an aqueous solution of a soluble form of a metal catalyst compound to impregnate said support therewith and thereafter calcining the impregnated catalyst support to produce a solid supported catalyst, the improvement comprising forming a slurry of the hydrophilic catalyst support and an essentially water-immiscible liquid prior to contact with the aqueous solution and thereafter intimately mixing the slurry with the aqueous solution to form a liquid dispersion of the aqueous solution and water-immiscible liquid in contact with the solid hydrophilic catalyst support whereby the aqueous solution enters the pores of the solid catalyst support to displace the water-immiscible liquid and impregnate the catalyst support.

2. In a method as defined in claim 1, the improvement wherein said water-immiscible liquid is a hydrocarbon.

3. In a method as defined in claim 2, the improvement wherein said hydrocarbon is selected from the group consisting of hexane, cyclohexane, heptane, benzene, toluene, xylene and mixtures thereof.

4. In a method as defined in claim 3, the improvement wherein said porous catalyst support has pore openings between 5 and 1000 angstrom units.

5. In a method as defined in claim 4, the improvement wherein said porous support material comprises alumina.

6. In a method as defined in claim 4, the improvement wherein said porous catalyst support has pore openings between 5 and 500 angstrom units.

7. In a method as defined in claim 5, the improvement wherein said hydrocarbon is heptane.

8. In a method as defined in claim 7, the improvement wherein said metal catalyst component is chromia.

References Cited

UNITED STATES PATENTS 2,746,936   5/1956   Plank _____ 252—465

FOREIGN PATENTS 642,970   9/1950   Great Britain _____ 252—477

DANIEL E. WYMAN, Primary Examiner

W. J. SHINE, Assistant Examiner

U.S. Cl. X.R.
252—463